US010579306B1

(12) United States Patent
Huang et al.

(10) Patent No.: US 10,579,306 B1
(45) Date of Patent: Mar. 3, 2020

(54) MEMORY MANAGEMENT METHOD AND STORAGE CONTROLLER

(71) Applicant: Shenzhen EpoStar Electronics Limited CO., Shenzhen (CN)

(72) Inventors: Shang-Pin Huang, Hsinchu County (TW); Hung-Chih Hsieh, Hsinchu County (TW); Yu-Hua Hsiao, Hsinchu County (TW)

(73) Assignee: Shenzhen EpoStar Electronics Limited CO., Shenzhen (CN)

( * ) Notice: Subject to any disclaimer, the term of this patent is extended or adjusted under 35 U.S.C. 154(b) by 0 days.

(21) Appl. No.: 16/174,294

(22) Filed: Oct. 30, 2018

(30) Foreign Application Priority Data

Aug. 28, 2018 (TW) .............................. 107130025 A

(51) Int. Cl.
  *G06F 12/00* (2006.01)
  *G06F 3/06* (2006.01)
  *G06F 12/0804* (2016.01)

(52) U.S. Cl.
  CPC .......... *G06F 3/0659* (2013.01); *G06F 3/0604* (2013.01); *G06F 3/0656* (2013.01); *G06F 3/0679* (2013.01); *G06F 12/0804* (2013.01); *G06F 2212/1044* (2013.01); *G06F 2212/202* (2013.01)

(58) Field of Classification Search
  CPC .. G06F 3/0659; G06F 12/0804; G06F 3/0604; G06F 3/0656; G06F 3/0679; G06F 2212/1044; G06F 2212/20
  See application file for complete search history.

(56) References Cited

U.S. PATENT DOCUMENTS

| | | | |
|---|---|---|---|
| 10,360,986 B1* | 7/2019 | Hsiao | G11C 8/08 |
| 10,474,386 B1* | 11/2019 | Hsiao | G11C 16/26 |
| 2010/0042755 A1* | 2/2010 | Fuente | G06F 13/28 |
| | | | 710/22 |
| 2016/0342545 A1* | 11/2016 | Arai | G06F 12/0868 |
| 2018/0095698 A1* | 4/2018 | Liao | G06F 3/0604 |
| 2019/0129976 A1* | 5/2019 | Cha | G06F 16/178 |
| 2019/0243774 A1* | 8/2019 | Liao | G06F 12/10 |
| 2019/0303239 A1* | 10/2019 | Hsiao | G11C 29/52 |
| 2019/0332331 A1* | 10/2019 | Hsieh | G06F 12/06 |

* cited by examiner

Primary Examiner — Jing-Yih Shyu
(74) Attorney, Agent, or Firm — JCIPRNET

(57) ABSTRACT

A memory management method is provided. The method includes storing an acquired first command into a command queue, and setting a command phase value of the first command according to a current command phase, wherein in response to determining that the first command is a flush command, calculating a command phase count value corresponding to the current command phase, and adjusting the current command phase; selecting a new target command from the command queue, and executing the target command according to a target command phase value of the target command and a corresponding target command phase count value, wherein the target command phase count value which is not a preset value is adjusted; determining, according to the adjusted target command phase count value, whether to respond to a host system that an execution of a target flush command corresponding to the target command phase value is completed.

12 Claims, 14 Drawing Sheets

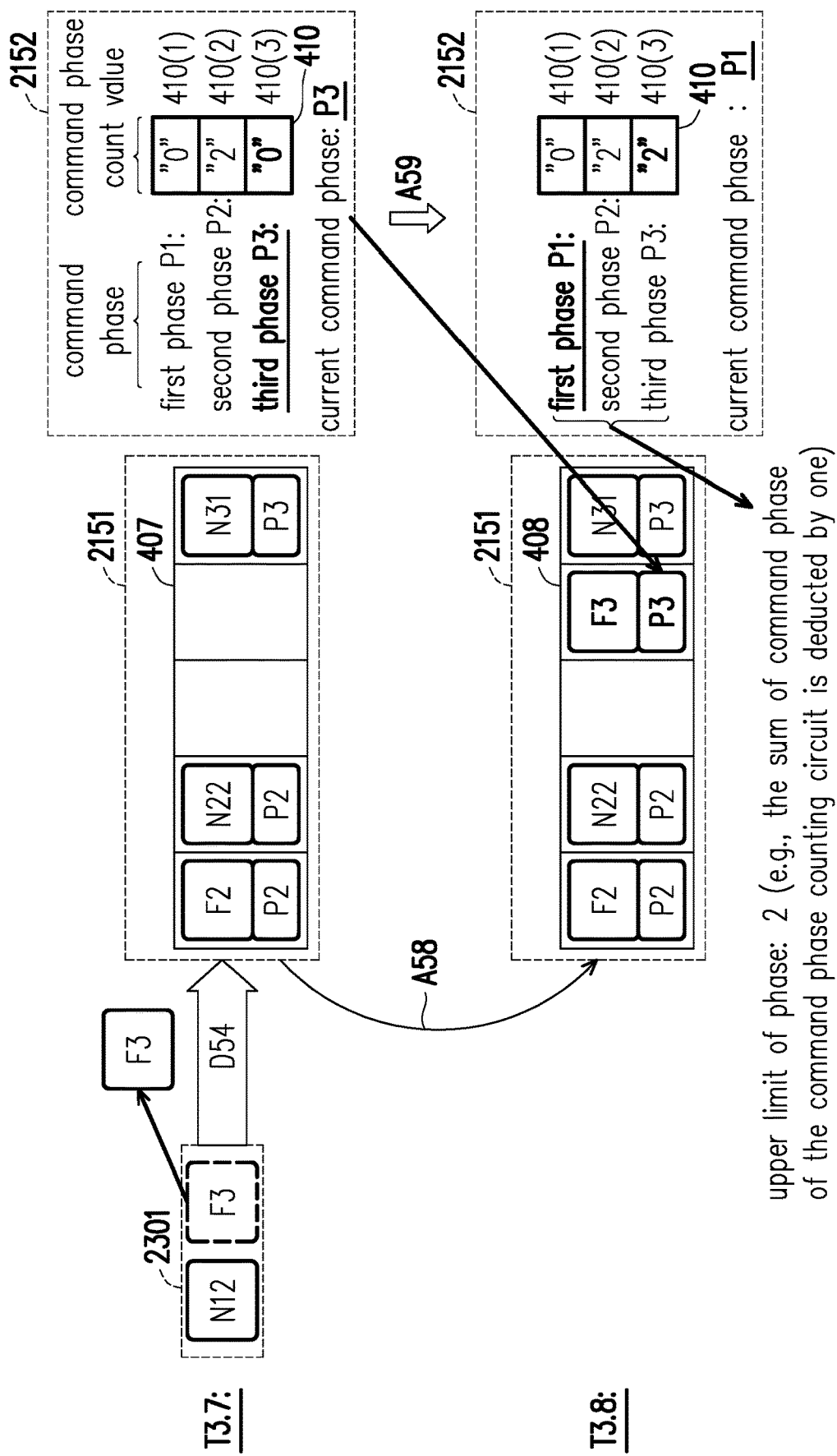

MEMORY MANAGEMENT METHOD AND STORAGE CONTROLLER

CROSS-REFERENCE TO RELATED APPLICATION

This application claims the priority benefit of Taiwan application serial no. 107130025, filed on Aug. 28, 2018. The entirety of the above-mentioned patent application is hereby incorporated by reference herein and made a part of this specification.

BACKGROUND OF THE DISCLOSURE

Field of the Disclosure

The disclosure relates to a memory management method, and more particularly to a memory management method and a storage controller adapted for a storage device equipped with a rewritable non-volatile memory module.

Description of Related Art

A solid state drive (storage device with rewritable non-volatile memory module) with a conventional SATA (Serial Advanced Technology Attachment) interface would normally be adapted to an advanced host controller interface (AHCI) standard, which allows software to communicate with SATA storage device. In general, AHCI has 32 command depths, allowing the host system to give 32 commands at the same time.

However, as hardware development progresses, the solid state drive with the SATA interface is also evolved into a solid state drive with a PCIe (Peripheral Component Interconnect Express) interface, and the solid state drive with the PCIe interface is adapted to a non-volatile memory host controller interface (Non-Volatile Memory express, hereinafter referred to as NVMe) standard. In general, NVMe has 65,536 command depths, allowing the host system to send 65,536 commands at the same time. In other words, because the NVMe standard can provide the command depth by nearly two thousand times, the number of commands from the host system that the storage controller needs to manage also increases significantly.

In view of the above, it is a goal for practitioners of the field to manage the large amount of commands received under NVMe standard and improve the efficiency of the solid-state drive with the PCIe interface in processing commands.

SUMMARY OF THE DISCLOSURE

The disclosure provides a memory management method (also referred to as a host command management method) and a storage controller, capable of efficiently digest a plurality of commands in a command queue and reduce resource robbing caused by a flush command.

An embodiment of the disclosure provides a memory management method adapted for a storage device equipped with a rewritable non-volatile memory module. The method includes the steps of: (1) acquiring a new first command from an command buffer, and determining whether the first command is a flush command, wherein in response to determining that the first command is the flush command, performing step (2a), wherein in response to determining that the first command is not the flush command, performing step (2b); (2a) setting a command phase value of the flush command according to a current command phase, storing the flush command into a command queue, identifying a plurality of second commands corresponding to the current command phase in the command queue, and counting a sum of the plurality of second commands to become a command phase count value corresponding to the current command phase; adjusting the current command phase from a first command phase of the plurality of command phases into a second command phase; and performing step (1) or step (3) according to the remaining space in the command queue and the sum of one or more flush commands in the command queue; (2b) setting a command phase value of the first command according to the current command phase, storing the first command into the command queue, and performing step (1) or step (3) according to the remaining space in the command queue; (3) not acquiring the new first command from the command buffer, and performing step (4); (4) selecting a new target command from one or more non-flush commands in the command queue, identifying a target command phase value of the target command and a target command phase count value corresponding to the target command phase value, wherein in response to that the identified target command phase count value is equal to a preset value, performing step (5a), wherein in response to that the identified target command phase count value is not equal to the preset value, performing step (5b); (5a) executing the target command, and in response to completing execution of the target command, deleting the target command from the command queue, and performing step (1); (5b) changing the target command phase count value, and performing step (5a) or step (5c) according to the changed target command phase count value; (5c) executing the target command, responding to a host system that execution of the target flush command corresponding to the target command phase value is completed, setting the target command phase count value as the preset value, and performing step (1).

An embodiment of the disclosure provides a storage controller for controlling a storage device equipped with a rewritable non-volatile memory module. The storage controller includes: a connection interface circuit, a memory interface control circuit, a host command management circuit unit, and a processor. The connection interface circuit is coupled to a host system. The memory interface control circuit is coupled to the rewritable non-volatile memory module. The processor is coupled to the connection interface circuit, the memory interface control circuit, and the host command management circuit unit. The processor, wherein the processor is configured to instruct the host command management circuit unit to perform a host command management operation. The host command management operation includes the following steps: (1) the host command management circuit unit acquires a new first command from a command buffer, and determines whether the first command is a flush command, wherein in response to determining the first command is the flush command, step (2a) is performed, wherein step (2b) is performed in response to determining that the first command is not the flush command; (2a) the host command management circuit unit sets the command phase value of the flush command according to a current command phase, the flush command is stored into a command queue, a plurality of second commands corresponding to the current command phase in the command queue are identified, and the sum of the plurality of second commands are counted to become a command phase count value corresponding to the current command phase; the host command management circuit unit adjusts the current command phase from a first command phase of the plurality of command phases into a second command phase; and the host command management circuit unit performs step (1) or step (3) according to a remaining space in the command queue and the sum of one or more of flush commands in the command queue; (2b) the host command management circuit unit sets an command phase value of the first command according to the current command phase, and stores the first command into the command queue, and performs step (1) or step (3) according to the remaining space of the command queue; (3) the host command management circuit unit does not acquire a new first command from the command buffer and performs step (4); (4) the host command management circuit unit selects a new target command from one or more non-flush commands in the command queue, and identifies a target command phase value of the target command and a target command phase count value corresponding to the target command phase value, wherein in response to that the identified target command phase count value is equal to a preset value, step (5a) is performed, wherein in response to that the identified target command phase count value is not equal to the preset value, step (5b) is performed; (5a) the host command management circuit unit instructs the processor to execute the target command, and in response to completing execution of the target command, deletes the target command from the command queue, and performs step (1); (5b) the host command management circuit unit changes the target command phase count value, and performs step (5a) or step (5c) according to the changed target command phase count value; (5c) the host command management circuit unit instructs the processor to execute the target command, responds to a host system that execution of the target flush command corresponding to the target command phase value is completed, and sets the target command phase count value as the preset value, and step (1) is performed.

Based on the above, the memory management method and the storage controller provided in the embodiment are capable of recording the corresponding command phase count value and update the current command phase when the command queue receives the flush command, and do not directly execute and clear the non-flush command corresponding to the flush command in the command queue according to the received flush command. In addition, the recorded command phase count value is further adjusted according to different conditions to manage commands corresponding to different command phases in the command queue, thereby completing the received flush command. That is to say, the memory management method and the storage controller provided in this embodiment may make the non-flush command corresponding to the flush command in the command queue have no special priority, so as to avoid delaying execution of other commands. In this manner, the storage device may complete the received flush command while smoothly digesting (executing) all the commands in the command queue, thereby improving the data access efficiency and work efficiency of the storage device.

In order to make the aforementioned features and advantages of the disclosure more comprehensible, embodiments accompanying figures are described in detail below.

BRIEF DESCRIPTION OF THE DRAWINGS

FIG. 5A to FIG. 5D are schematic diagrams illustrating a management command queue according to another embodiment of the disclosure.

DESCRIPTION OF EMBODIMENTS

In the embodiment, a storage device includes a rewritable non-volatile memory module and a storage device controller (also known as a storage controller or a storage control circuit). Also, the storage device is usually used together with a host system so the host system can write data into or read data from the storage device.

Figure 1:
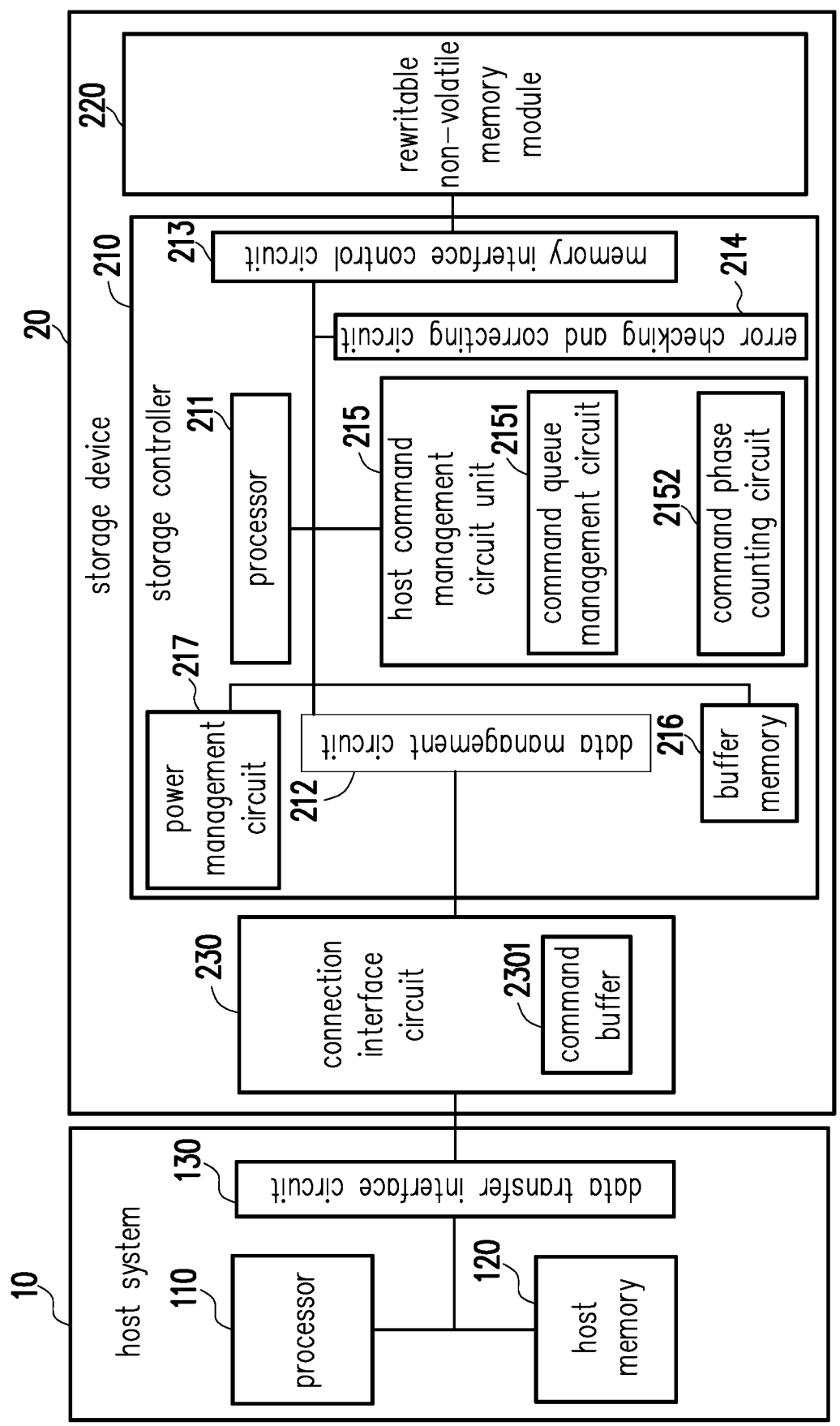
FIG. 1 is a block diagram illustrating a host system and a storage device according to an embodiment of the disclosure.

FIG. 1 is a block diagram illustrating a host system and a storage device according to an embodiment of the disclosure.

With reference to FIG. 1, a host system 10 includes a processor 110, a host memory 120 and a data transfer interface circuit 130. In this embodiment, the data transfer interface circuit 130 is coupled to (or, electrically connected to) the processor 110 and the host memory 120. In another embodiment, the processor 110, the host memory 120 and the data transfer interface circuit 130 are coupled to one another by utilizing a system bus.

A storage device 20 includes a storage controller 210, a rewritable non-volatile memory module 220 and a connection interface circuit 230. Among them, the storage controller 210 includes a processor 211, a data management circuit 212 and a memory interface control circuit 213.

In this embodiment, the host system 10 is coupled to the storage device 20 through the data transfer interface circuit 130 and the connection interface circuit 230 of the storage device 20 to perform a data accessing operation. For example, the host system 10 can store data to the storage device 20 or read data from the storage device 20 through the data transfer interface circuit 130.

In the present embodiment, the processor 110, the host memory 120 and the data transfer interface circuit 130 may be disposed on a main board of the host system 10. The number of the data transfer interface circuit 130 may be one or more. Through the data transfer interface circuit 130, the main board may be coupled to the storage device 20 in a wired manner or a wireless manner. The storage device 20 may be, for example, a flash drive, a memory card, a solid state drive (SSD) or a wireless memory storage device. The wireless memory storage device may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board may also be coupled to various I/O devices including a GPS (Global Positioning System) module, a network interface card, a wireless transmission device, a keyboard, a monitor and a speaker through the system bus.

In this embodiment, the data transfer interface circuit 130 and the connection interface circuit 230 are an interface circuit compatible with a Peripheral Component Interconnect Express (PCI Express) interface standard. Further, a data transfer is performed between the data transfer interface circuit 130 and the connection interface circuit 230 by using a communication protocol of a Non-Volatile Memory express (NVMe) interface standard.

Nevertheless, it should be understood that the disclosure is not limited to the above. The data transfer interface circuit 130 and the connection interface circuit 230 may also be compatible to a PATA (Parallel Advanced Technology Attachment) standard, an IEEE (Institute of Electrical and Electronic Engineers) 1394 standard, a Serial Advanced Technology Attachment (SATA) standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC interface standard, a UFS (Universal Flash Storage) interface standard, an eMCP interface standard, a CF interface standard, an IDE (Integrated Device Electronics) interface standard or other suitable standards. Further, in another embodiment, the connection interface circuit 230 and the storage controller 210 may be packaged into one chip, or the connection interface circuit 230 is distributed outside a chip containing the storage controller 210.

In this embodiment, the host memory 120 is configured to temporarily store commands executed by the processor 110 or data. For instance, in this exemplary embodiment, the host memory 120 may be a DRAM (Dynamic Random Access Memory), or a SRAM (Static Random Access Memory) and the like. Nevertheless, it should be understood that the disclosure is not limited in this regard, and the host memory 120 may also be other appropriate memories.

The storage controller 210 is configured to execute a plurality of logic gates or control commands, which are implemented in a hardware form or in a firmware form, and to perform operations of writing, reading or erasing data in the rewritable non-volatile memory module 220 according to the commands of the host system 10.

More specifically, the processor 211 in the storage controller 210 is a hardware with computing capabilities, which is configured to control overall operation of the storage controller 210. Specifically, the processor 211 has a plurality of control commands and the control commands are executed to perform various operations such as writing, reading and erasing data during operation of the storage device 20.

It should be noted that, in the present embodiment, the processor 110 and the processor 211 are, for example, a central processing unit (CPU), a micro-processor, other programmable microprocessors, a digital signal processor (DSP), a programmable controller, an application specific integrated circuits (ASIC), a programmable logic device (PLD) or other similar circuit elements. The disclosure is not limited in this regard.

In an embodiment, the storage controller 210 further includes a ROM (not illustrated) and a RAM (not illustrated). More particularly, the ROM has a boot code, which is executed by the processor 211 to load the control commands stored in the rewritable non-volatile memory module 220 into the RAM of the storage controller 210 when the storage controller 210 is enabled. Then, the control commands are executed by the processor 211 to perform operations, such as writing, reading or erasing data. In another embodiment, the control commands of the processor 211 may also be stored as program codes in a specific area (for example, physical storage units in the rewritable non-volatile memory module 220 dedicated for storing system data) of the rewritable non-volatile memory module 220.

In this embodiment, as described above, the storage controller 210 further includes the data management circuit 212 and the memory interface control circuit 213. It should be noted that, operations performed by each part of the storage controller 210 may also be considered as operations performed by the storage controller 210.

The data management circuit 212 is coupled to the processor 211, the memory interface control circuit 213 and the connection interface circuit 230. The data management circuit 212 is configured to transmit data under instruction of the processor 211. For example, the data may be read from the host system 10 (e.g., the host memory 120) through the connection interface circuit 230, and the read data may be written into the rewritable non-volatile memory module 220 through the memory interface control circuit 213 (e.g., a writing operation performed according to the write command from the host system 10). As another example, the data may be read from one or more physical units of the rewritable non-volatile memory module 220 through the memory interface control circuit 213 (the data may be read from one or more memory cells in one or more physical units), and the read data may be written into the host system 10 (e.g., the host memory 120) through the connection interface circuit 230 (e.g., a reading operation performed according to a read command from the host system 10). In another embodiment, the data management circuit 212 may also be integrated into the processor 211.

The memory interface control circuit 213 is configured to perform the writing (or, programming) operation, the reading operation and the erasing operation for the rewritable non-volatile memory module 220 together with the data management circuit 212 under instruction of the processor 211 (or host command management circuit unit 215). For example, a reading operation for a storage unit of the rewritable non-volatile memory module 220 is performed by using a specific read voltage according to the instruction of the host command management circuit unit 215.

For instance, the processor 211 may execute a write command sequence to instruct the memory interface control circuit 213 to write the data into the rewritable non-volatile memory module 220; the processor 211 can execute a read command sequence to instruct the memory interface control circuit 213 to read the data from one or more physical units corresponding to the read command in the rewritable non-volatile memory module 220; the processor 211 can execute an erase command sequence to instruct the memory interface control circuit 213 to perform the erasing operation for the rewritable non-volatile memory module 220. Each of the write command sequence, the read command sequence and the erase command sequence may include one or more program codes or command codes, which are configured to perform the corresponding writing, reading and erasing operations on the rewritable non-volatile memory module 220. In an embodiment, the processor 211 may further send other types of command sequences to the memory interface control circuit 213 so as to perform corresponding operations on the rewritable non-volatile memory module 220.

In addition, data to be written to the rewritable non-volatile memory module 220 is converted into a format acceptable by the rewritable non-volatile memory module 220 through the memory interface control circuit 213. Specifically, if the processor 211 is to execute the write or read command to access the rewritable non-volatile memory module 220, the processor 211 transmits a corresponding command sequence to the memory interface control circuit 213 to instruct the memory interface control circuit 213 to perform a corresponding operation. For example, the command sequences may include a write command sequence instructing to write data, a read command sequence instructing to read data, an erase command sequence instructing to erase data and corresponding command sequences instructing to perform various memory operations (e.g., wear-leveling operation or garbage collecting operation and so on). The command sequences may include one or more signals, or data from the bus. The signals or the data may include command codes and program codes. For example, information such as identification codes and memory addresses are included in the read command sequence.

The rewritable non-volatile memory module 220 is coupled to the storage controller 210 (the memory interface control circuit 213) and configured to store data written from the host system 10. The rewritable non-volatile memory module 220 may be a SLC (Single Level Cell) NAND flash memory module (i.e., a flash memory module capable of storing one bit in one memory cell), an MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a QLC (Quadruple Level Cell) NAND flash memory module (i.e., a flash memory module capable of storing four bits in one memory cell), a 3D NAND flash memory module or a vertical NAND flash memory module, a vertical NAND flash memory module or a vertical NAND flash memory module other flash memory modules or any memory module having the same features. The memory cells in the rewritable non-volatile memory module 220 are disposed in an array.

In this embodiment, the rewritable non-volatile memory module 220 has a plurality of word lines, wherein each word line among the word lines includes a plurality of memory cells. The memory cells on the same word line constitute one or more physical programming units (physical pages). In addition, a plurality of physical programming units may constitute one physical unit (a physical block or a physical erasing unit). In the embodiment, one physical programming unit may have different types of physical pages. For example, in an embodiment, for a TLC NAND flash memory module, a physical programming unit of the TLC NAND flash memory module may have a first type of physical page and a second type of physical page. The first type of physical page is, for example, a lower physical page storing one bit value; the second type of physical page is, for example, a middle physical page and an upper physical page respectively storing one bit value. As another example, in an embodiment, for a TLC NAND flash memory module, a physical programming unit of the TLC NAND flash memory module may have a first type of physical page, a second type of physical page and a third type of physical page. The first type of physical page is, for example, a lower physical page storing one bit value; the second type of physical page is, for example, a middle physical page storing one bit value; the third type of physical page is, for example, an upper physical page storing one bit value. Generally, when the data is to be written to the upper, middle, and lower physical pages of a physical programming unit of the TLC NAND flash memory module, the data is sequentially written from the lower physical page to the middle physical page, and finally written to the upper physical page.

In this embodiment, one physical erasing unit is used as a minimum unit for erasing data. That is, each physical erasing unit contains a minimum number of memory cell that is erased. Each physical erasing unit has multiple physical programming units. One physical erasing unit may constitute a random number of physical programming units depending on practical requirements.

In the following embodiments, it is exemplified that one physical block serves as one physical erasing unit (also referred to as physical unit), and each of the physical programming units is regarded as one physical sub-unit. Further, it should be understood that, when the processor 211 groups the physical programming units (or the physical units) in the rewritable non-volatile memory module 220 for the corresponding management operations, the physical programming units (or the physical units) are logically grouped and their actual locations are not changed.

The storage controller 210 assigns a plurality of logical units for the rewritable non-volatile memory module 220. The host system 10 accesses user data stored in a plurality of physical units through the assigned logical units. Here, each of the logical units may be composed of one or more logical addresses. For example, the logical unit may be a logical block, a logical page, or a logical sector. In the embodiment, the logical unit is a logical block, and the logical sub-unit is a logical page. Each of the logical units has multiple logical sub-units. One logical unit may be mapped to one physical unit, and one logical sub-unit may be mapped to one physical sub-unit.

Additionally, the storage controller 210 would create a logical-to-physical address mapping table and a physical-to-logical address mapping table for recording a mapping relation between the logical addresses (e.g., logical blocks, logical pages, or logical sectors) assigned to the rewritable non-volatile memory module 220 and the physical addresses (e.g., physical erasing units, physical programming units, physical sectors). In other words, the storage controller 210 can look up for the physical address mapped by one logical unit by using the logical-to-physical address mapping table, and the storage controller 210 can look up for the logical address mapped by one physical address by using the physical-to-logical address mapping table. Nonetheless, the technical concept for the mapping relation between the logical addresses and the physical addresses is a well-known technical means in the field, which is not repeated hereinafter.

In this embodiment, the error checking and correcting circuit 214 is coupled to the processor 211 and configured to execute an error checking and correcting procedure to ensure correctness of data. Specifically, when the processor 211 receives the write command from the host system 10, the error checking and correcting circuit 214 generates an ECC (error correcting code) and/or an EDC (error detecting code) for data corresponding to the write command, and the processor 211 writes data corresponding to the write command and the corresponding ECC and/or the EDC into the rewritable non-volatile memory module 220. Then, when the processor 211 reads the data from the rewritable non-volatile memory module 220, the ECC and/or the EDC corresponding to the data are also read, and the error checking and correcting circuit 214 performs the error checking and correcting procedure on the read data based on the ECC and/or the EDC. In addition, after the error checking and correcting procedure is completed, if the read data is successfully decoded, the error checking and correcting circuit 214 can return an error bit value (also referred to as error bit number) to the processor 211.

In an embodiment, the storage controller 210 further includes a buffer memory 216 and a power management circuit 217. The buffer memory 216 is coupled to the processor 211 and configured to temporarily store data and commands from the host system 10, data from the rewritable non-volatile memory module 220 or other system data for managing the storage device 20 so the processor 211 can rapidly access the data, the command or the system data from the buffer memory 216. The power management circuit 217 is coupled to the processor 211 and configured to control power of the storage device 20.

It should be noted that, in this embodiment, the connection interface circuit 230 has a command buffer 2301 for temporarily storing commands (also referred to as host commands) from the host system 10. The temporarily stored host commands are transmitted to the command queue managed by a host command management circuit unit 215 for further management. The command buffer 2301 is, for example, a static random access memory or other similar memory/storage circuit.

In the embodiment, the host command management circuit unit 215 includes a command queue management circuit 2151 and a command phase counting circuit 2152. The processor 211 instructs the host command management circuit unit 215 to execute host command management operations. The operations performed by the components of the host command management circuit unit 215 may also be regarded as operations performed by the host command management circuit unit 215. The host command management circuit unit 215 (or the command queue management circuit 2151) is configured to manage a command queue for storing the host command received from the command buffer 2301 according to the command receiving order. In addition, the host command management circuit unit 215 (or the command phase counting circuit 2152) may also be used to record and manage information about the host commands in the command queue, such as the command phase and the command phase count value corresponding to the received host command or a command phase count table.

The details of how the host command management circuit unit 215 performs host command management operations and the functions of the command queue management circuit 2151 and the command phase counting circuit 2152 are described below with reference to a plurality of drawings.

Figure 2A:
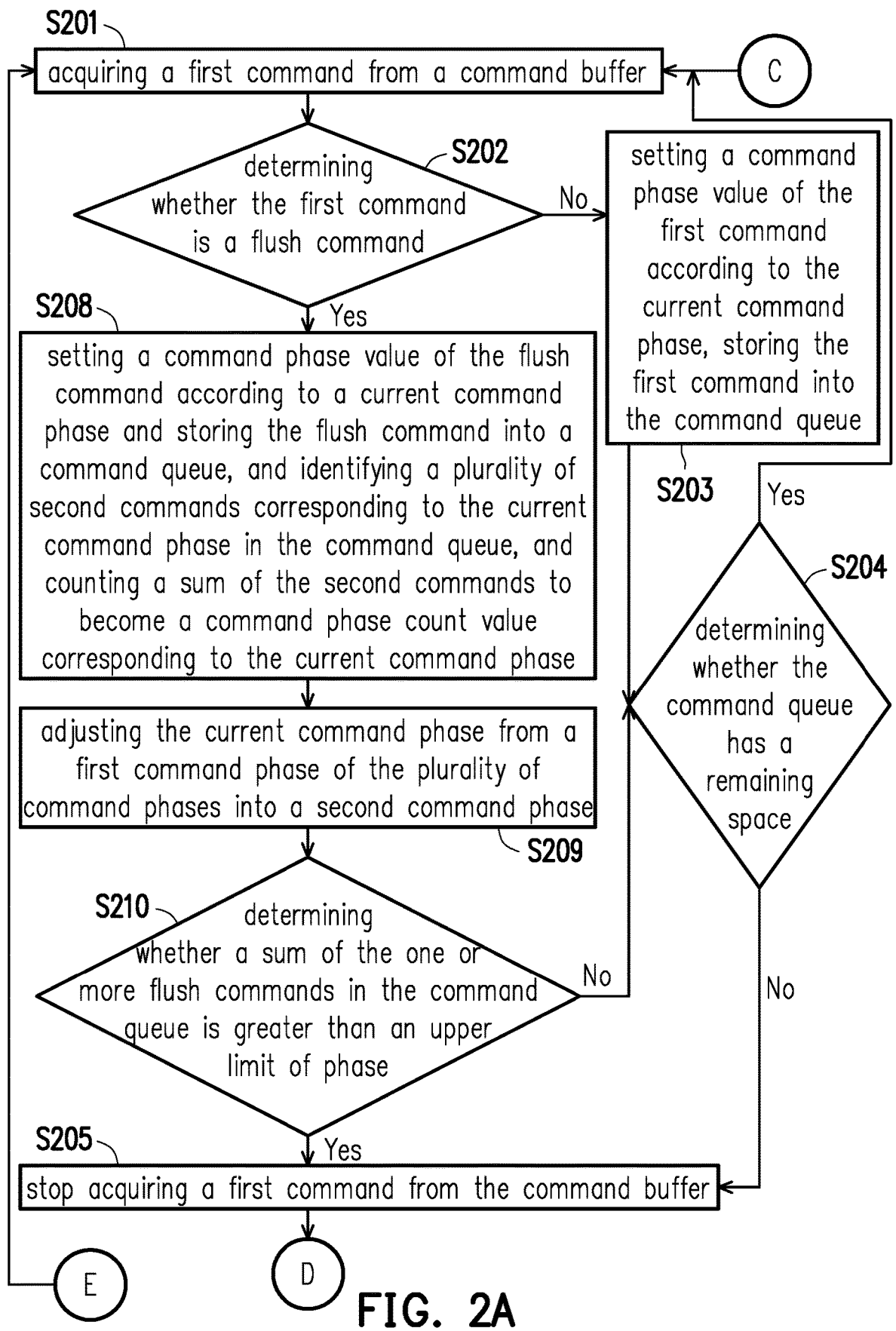
FIG. 2A, FIG. 2B and FIG. 2C are flowchart diagrams of a memory management method according to an embodiment of the disclosure.
Figure 2B:
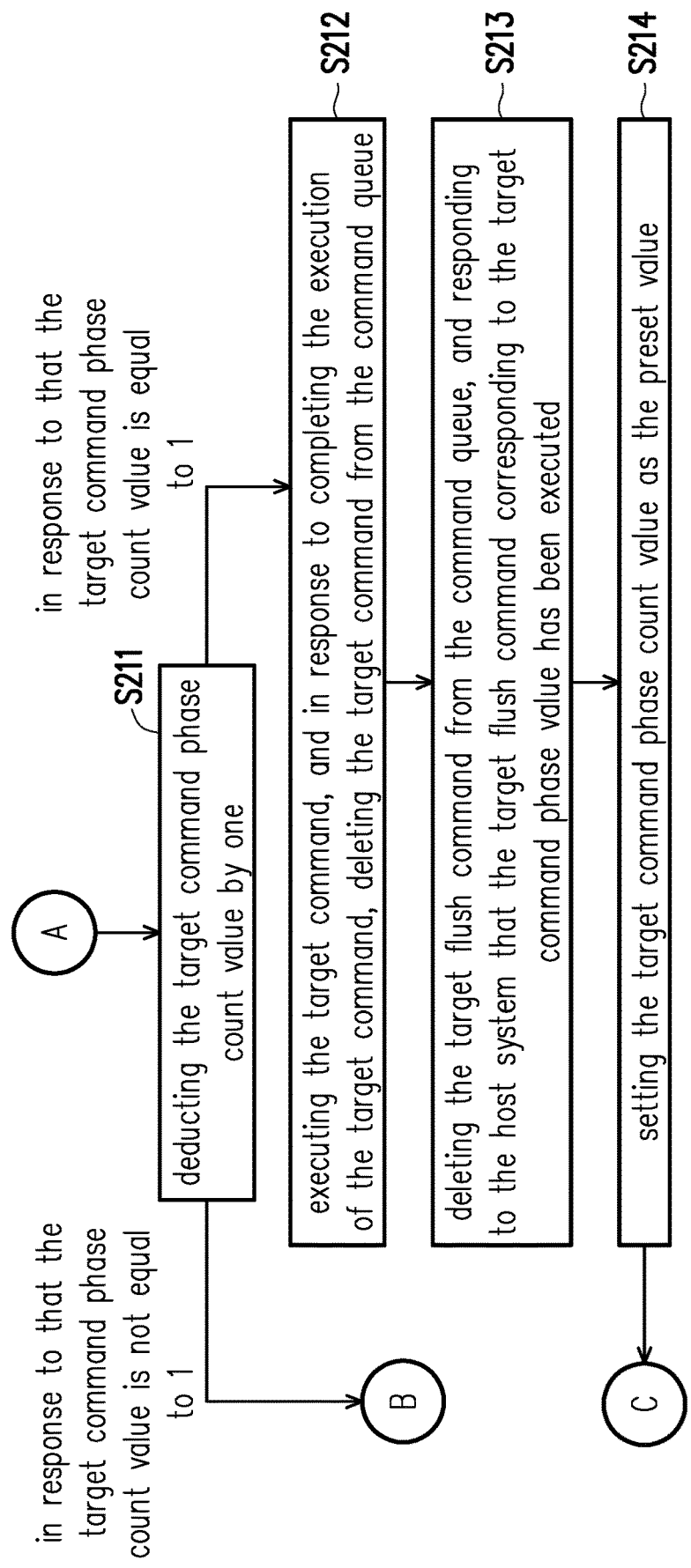
Figure 2C:
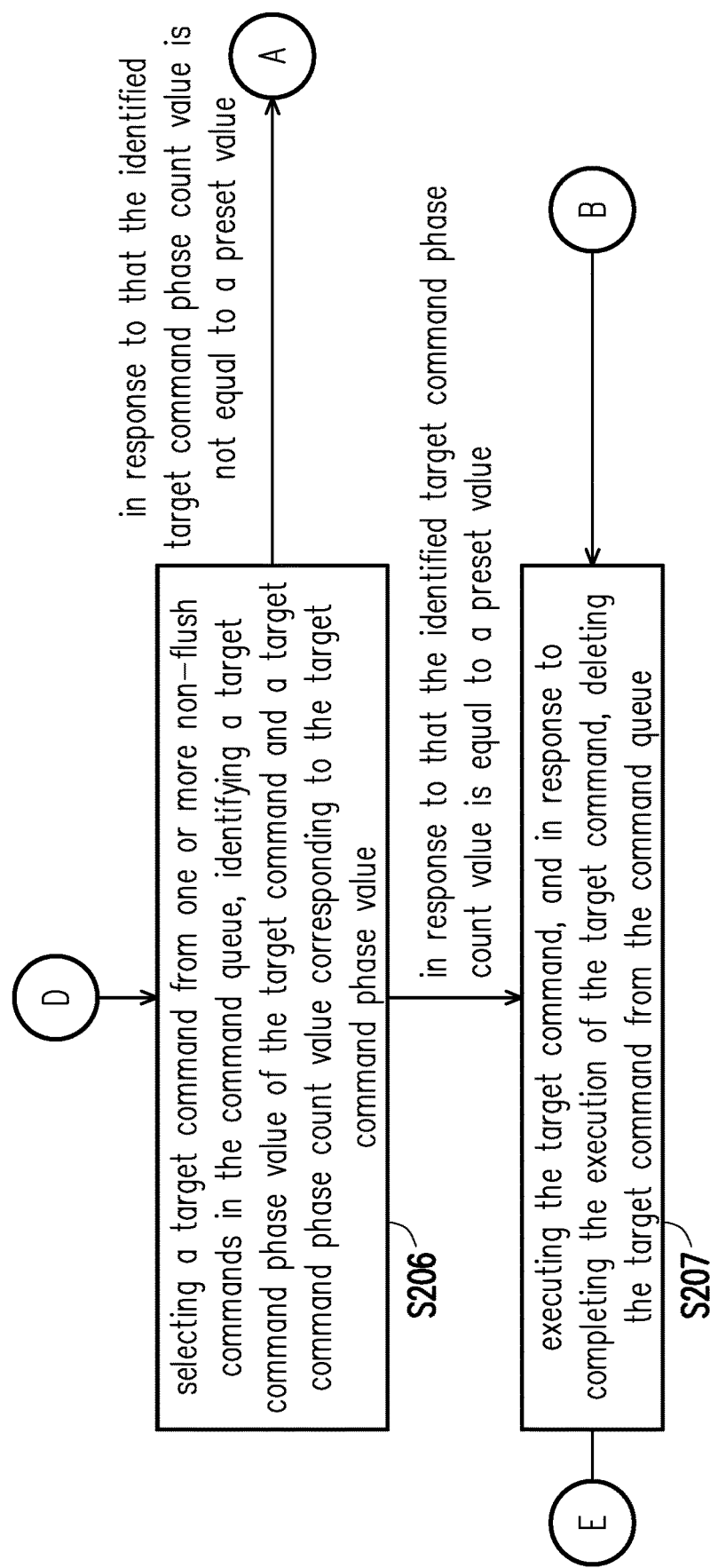

FIG. 2A, FIG. 2B and FIG. 2C are flowchart diagrams of a memory management method according to an embodiment of the disclosure. It should be noted that the memory management method illustrated in FIG. 2A, FIG. 2B and FIG. 2C may also be referred to as a host command management method. In addition, nodes A, B, C, D and E are only used to connect the processes for clarity of description and do not limit the disclosure. Referring to FIG. 1, FIG. 2A, FIG. 2B and FIG. 2C, in step S201, the command queue management circuit 2151 acquires a new first command from the command buffer 2301. The acquired first command is stored in the command queue of the command queue management circuit 2151.

Specifically, the processor 110 of the host system 10 may send a command (also referred to as a host command) to the storage device through a data transfer interface circuit. The host command is temporarily stored in the command buffer 2301. The host command may be divided into a flush command and a command not belonging to the flush command (also referred to as a non-flush command). The flush command corresponding to an identification unit (or corresponding to thread, or corresponding to namespace) is used to instruct to delete multiple non-flush commands corresponding to the identification unit from the command queue. The disclosure is not limited to the identification unit corresponding to the flush command. For example, in another embodiment, the identification unit includes, but is not limited to: (1) a client; (2) a terminal; (3) an entity.

The non-flush command includes, but is not limited to: (1) a command for accessing data such as a read command, a write command, etc.; and (2) a control command for controlling the storage device such as a trim command, a power-on command, a power-off command, a sleep command, etc.

The process flow of receiving a command from the host system by the command buffer is described below with reference to FIG. 3A and FIG. 3B.

Figure 3A:
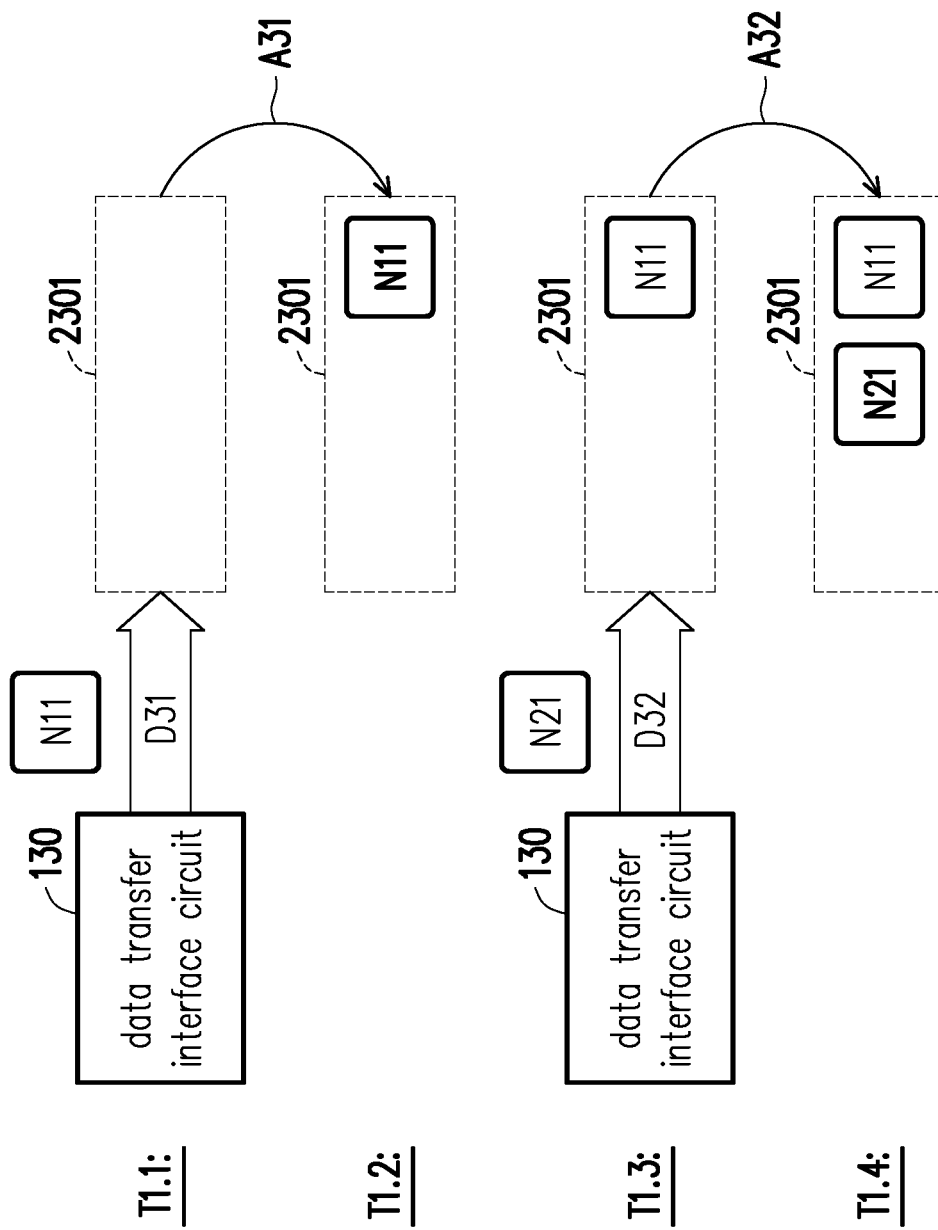
FIG. 3A and FIG. 3B are schematic diagrams showing a command buffer receiving a command from a host system according to an embodiment of the disclosure.
Figure 3B:
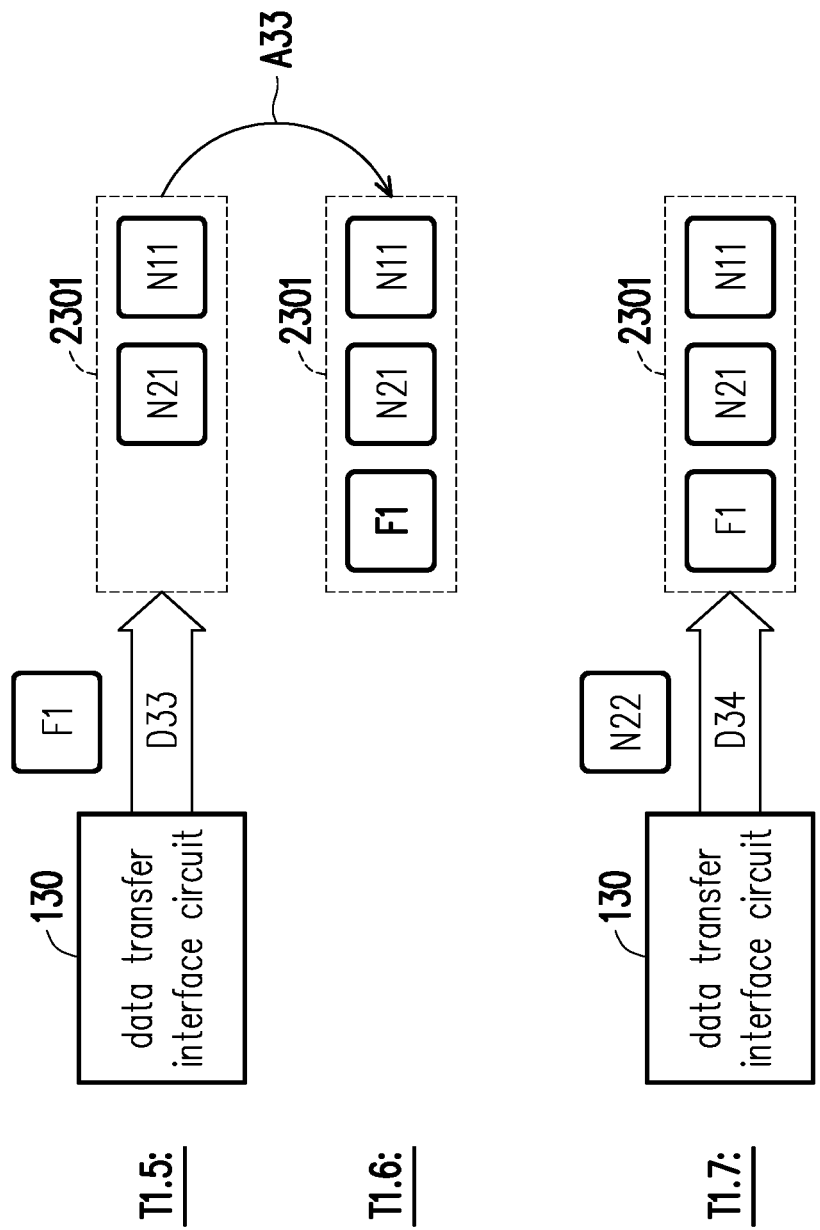

FIG. 3A and FIG. 3B are schematic diagrams showing a command buffer receiving a command from a host system according to an embodiment of the disclosure. Referring to FIG. 3A, for ease of explanation, it is assumed that the command buffer 2301 has a space for storing three commands only. At time point T1.1, the processor 110 of the host system 10 sends a command N11 to the command buffer 2301 through the data transfer interface circuit 130 (as indicated by arrow D31). The "N" in the command N11 is used to represent that the command is a non-flush command; the first "1" in the "11" is used to represent that the command corresponds to an identification uni ", and the second" in the "11" is used to represent that the command corresponds to the "1$^{st}$" command of the identification unit "1".

Then, at time point T1.2, the command buffer 2301 stores the received command N11 in a first in first out (FIFO) manner (as indicated by arrow A31). That is to say, the plurality of commands stored in the command buffer 2301 are arranged in chronological order, and the commands that are stored first are read (acquired) earlier.

Next, at time point T1.3, the processor 110 of the host system 10 sends a command N21 to the command buffer 2301 through the data transfer interface circuit 130 (as indicated by arrow D32). At time point T1.4, the command buffer 2301 stores the received command N21 in a first in first out manner (as indicated by arrow A32). The command N21 is arranged after the command N11.

Referring to FIG. 3B, next, at time point T1.5, the processor 110 of the host system 10 sends a command F1 to the command buffer 2301 through the data transfer interface circuit 130 (as indicated by arrow D33). The "F" in the command F1 is used to represent that the command is a flush command; "1" is used to represent that the command corresponds to the identification unit "1".

At time point T1.6, the command buffer 2301 stores the received command F1 in a first in first out manner (as indicated by arrow A33). The command F1 is arranged after the command N21. Since the commands N11 and F1 all correspond to the same identification unit "1", the flush command F1 corresponds to the non-flush command N11 stored in the command buffer 2301 earlier than the command F1. It should be noted that other non-flush commands corresponding to the identification unit "1" stored in the command buffer 2301 later than the flush command F1 do not correspond to the flush command F1. The flush command F1 is used to instruct to delete all the non-flush commands that are before the flush command F1 and correspond to the same identification unit "1" (for example, the flush command F1 is used to instruct to delete the command N11).

Next, at time point T1.7, the processor 110 of the host system 10 sends a command N22 to the command buffer 2301 through the data transfer interface circuit 130 (as indicated by arrow D34). Since the command buffer 2301 has no more space (full), the command N22 cannot be stored in the command buffer 2301. On this occasion, the processor 211 may instruct the host command management circuit unit 215 to perform a host command management operation in order to digest the command received from the host system and stored in the command buffer 2301, thereby enabling the command buffer 2301 to clear the space to receive the command N22.

Figure 4A:
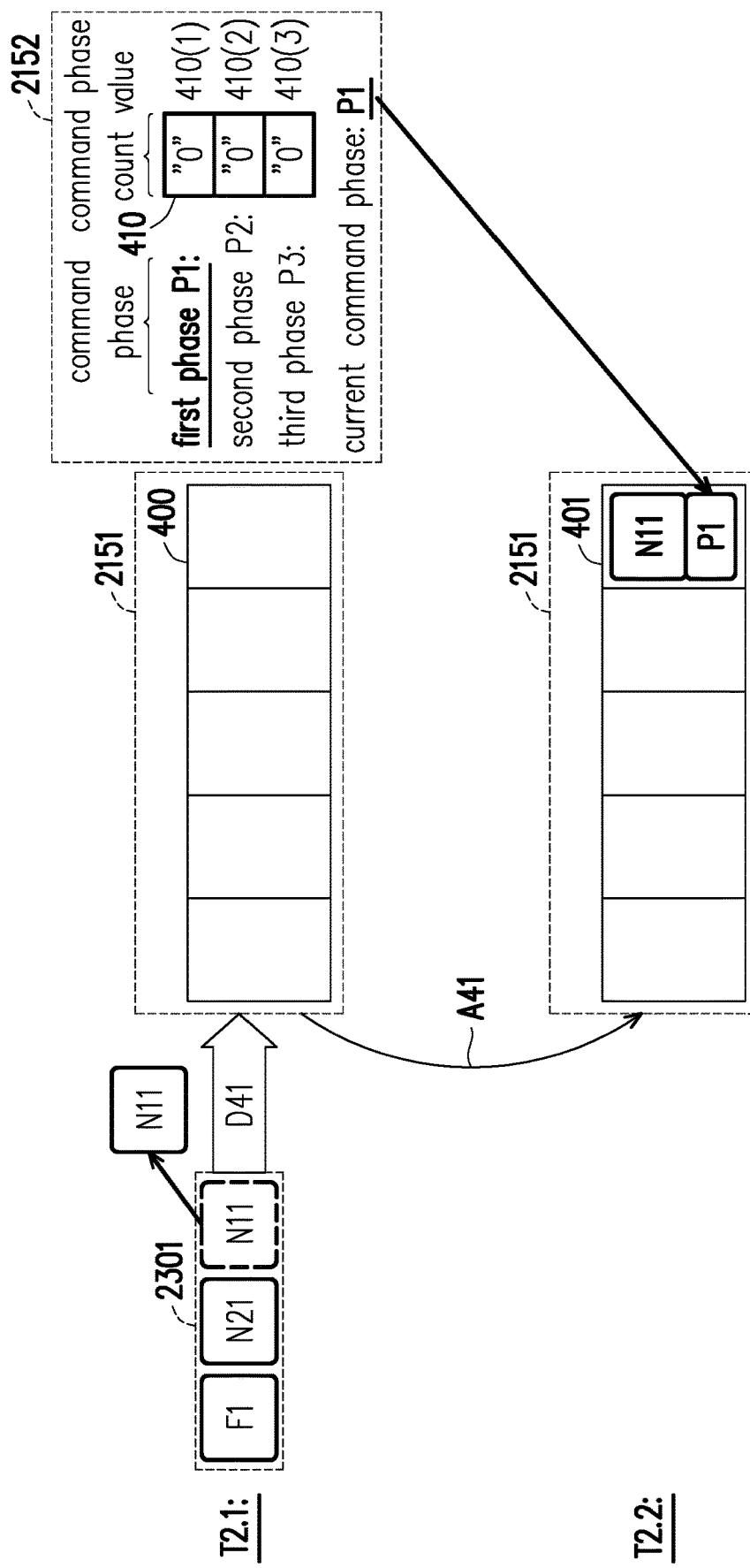
FIG. 4A to FIG. 4D are schematic diagrams illustrating a management command queue according to an embodiment of the disclosure.
Figure 4B:
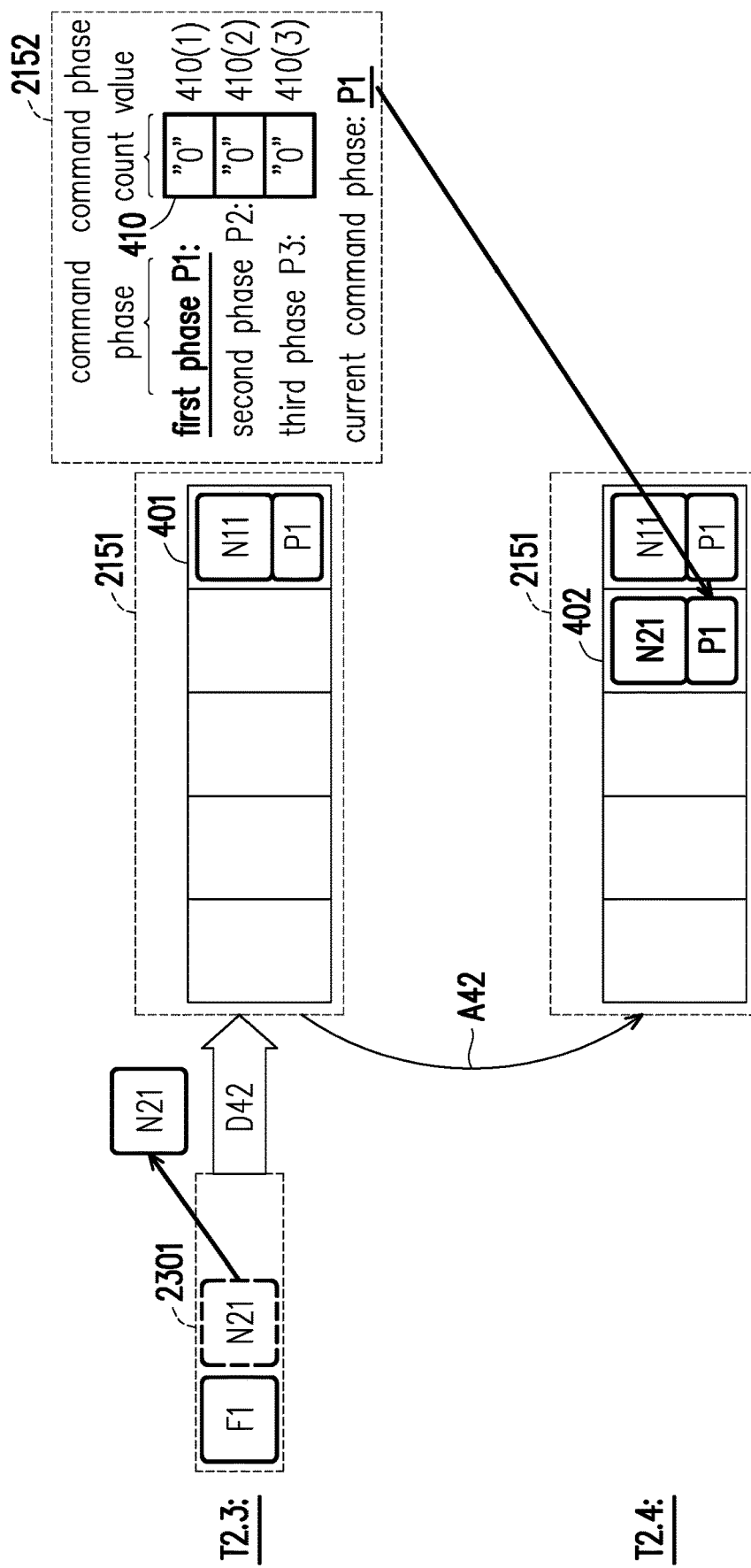

FIG. 4A to FIG. 4D are schematic diagrams illustrating a management command queue according to an embodiment of the disclosure. Referring to FIG. 4A, at time point T2.1, as indicated by an arrow D41, in continuation of the above example, the host command management circuit unit 215 acquires a new command (also referred to as a first command) N11 from the command buffer 2301. That is, the command N11 is transmitted (read) to the command queue management circuit 2151 of the host command management circuit unit 215, and the command queue management circuit 2151 stores the command N11 into the command queue 400. In addition, the command phase counting circuit 2152 records a plurality of command phase count values 410(1) to 410(3) respectively corresponding to the plurality of command phases P1 to P3. In this embodiment, the plurality of command phase count values 410(1)~410(3) have been initialized to preset values (e.g., "0").

In the embodiment, the command phase counting circuit 2152 may use the command phase count table 410 to record the plurality of command phase count values 410(1)~410(3) respectively corresponding to the plurality of command phases P1~P3. The command phases P1~P3 are arranged according to a round robin method. That is, the command phase P2 is arranged after the command phase P1; the command phase P3 is arranged after the command phase P2; the command phase P1 is arranged after the command phase P3. In addition, the command phase counting circuit 2152 further records the current command phase, which is used to represent that the current command phase is one of the plurality of command phases P1~P3. In this embodiment, in response to a specific event (e.g., the first command received from the command buffer 2301 is a flush command), the command phase counting circuit 2152 switches (adjusts) the current command from one command phase (also referred to as first command phase) into a command phase (also referred to as second command phase) arranged after the first command phase according to the command phases P1~P3 arranged in a cyclic manner. For example, the current command phase may be adjusted from the command phase P1 to the command phase P2; the current command phase may be adjusted from the command phase P2 to the command phase P3; the current command phase may be adjusted from the command phase P3 to the command phase P1. The current command phase is, for example, initialized into the command phase P1. The recorded current command phase may be integrated into the command phase count table (e.g., using a specific field to mark the current command phase as one of the plurality of command phases P1~P3).

Returning to FIG. 2A, next, in step S202, the command queue management circuit 2151 determines whether the first command is a flush command. It is determined whether to execute step S203 (S202→No) or S208 (S202→Yes) according to the acquired first command. In step S203, the command queue management circuit 2151 sets the command phase value of the first command according to the current command phase, and stores the first command into the command queue.

For example, referring to FIG. 4A, the command queue management circuit 2151 determines that the command N11 is not a flush command, sets a command phase value of the command N11 according to the current command phase P1 (as indicated by an arrow A41), and stores the command N11 and the command phase value "P1" marked to the command N11 into the command queue 401 (time point T2.2). That is to say, in this embodiment, all commands in the command queue are respectively marked with corresponding command phase values. It should be noted that in an embodiment, the read command in the command queue is not marked with the command phase value.

Next, in step S204, the command queue management circuit 2151 determines whether the command queue has remaining space. Specifically, in response to determining that the command queue has a remaining space, step S201 is performed; and in response to determining that the command queue does not have a remaining space, step S205 is performed.

For example, as shown in FIG. 4A, the command queue 400 has five remaining spaces; the command queue 401 has four remaining spaces (one remaining space has been used to store the command N11 and the corresponding command phase value). After storing the command N11 and the command phase value "P1" marked to the command N11 into the command queue 401, the command queue management circuit 2151 determines that the command queue 401 has a remaining space, and performs step S201 to continue obtaining another command (new first command) from the command buffer 2301. For example, referring to FIG. 4B, at time point T2.3, as indicated by arrow D42, the command N21 is obtained from the command buffer 2301. As indicated by an arrow A42, the command queue management circuit 2151 determines that the command N21 is not a flush command and identifies that the current command phase is "P1". Then, at time point T2.4, the command N21 and the corresponding command phase value "P1" are stored into the command queue 402 and arranged after the command N11.

Figure 4C:
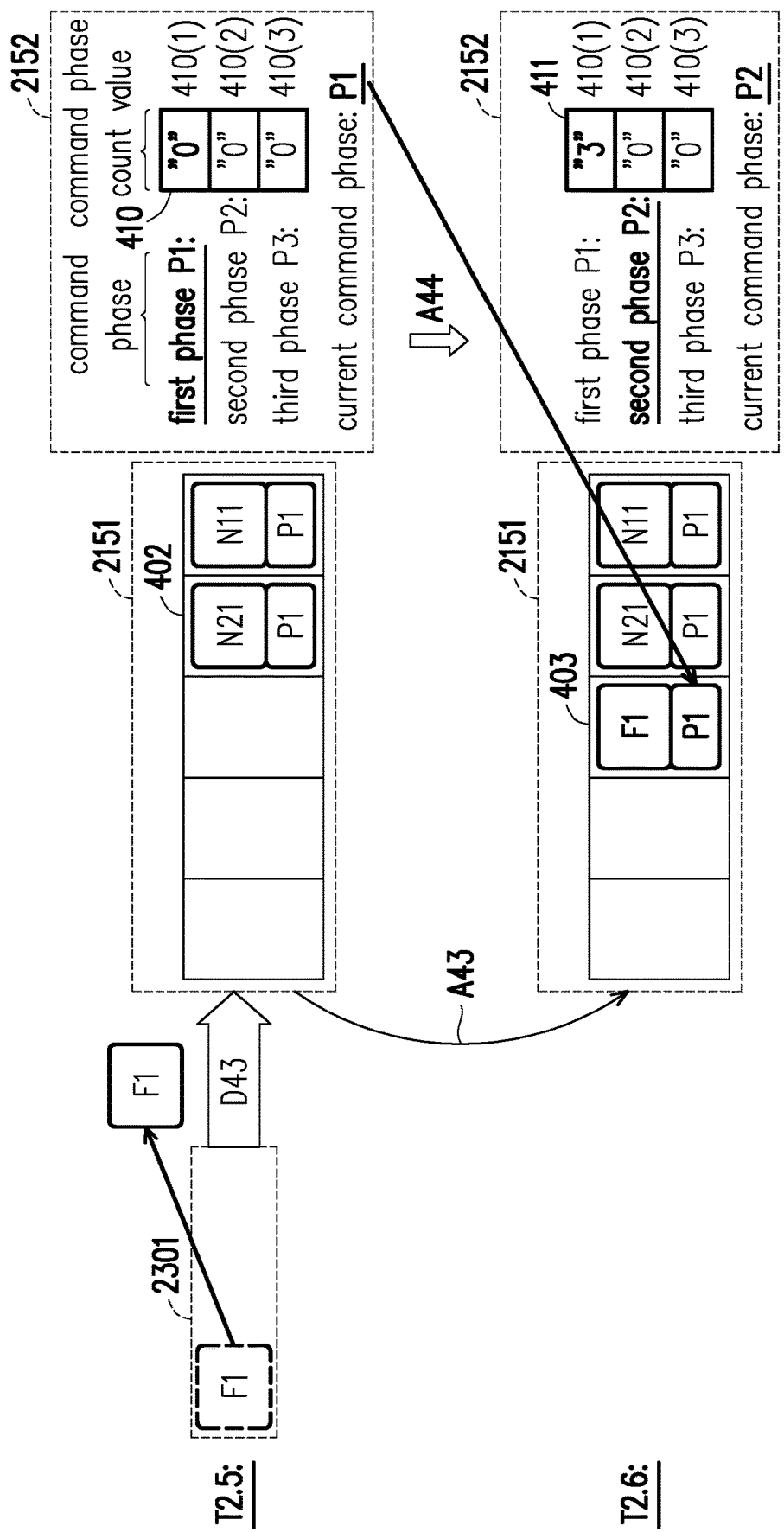

Since the command queue management circuit 2151 determines that the command queue 402 has a remaining space, the command queue management circuit 2151 performs step S201 to continue acquiring another command (new first command) from the command buffer 2301. As shown in FIG. 4C, at the time point T2.5, as indicated by arrow D42, the new command F1 is acquired, and the command queue management circuit 2151 determines that the command F1 is a flush command, and proceeds to step S208.

In step S208, the command queue management circuit 2151 sets a command phase value of the flush command according to a current command phase, stores the flush command into the command queue, and identifies a plurality of second commands corresponding to the current command phase in the command queue, and counts the sum of the plurality of second commands to become a command phase count value corresponding to the current command phase. Specifically, at time point T2.6, as indicated by an arrow A43, the above step of "setting the command phase value of the flush command according to the current command phase and storing the flush command into the command queue" is similar to step S203, and thus related description is omitted herein. That is, the command F1 and the corresponding command phase value "P1" are stored into the command queue 403. The difference is that, in response to that the identified first command is a flush command, the command phase counting circuit 2152 further counts the sum (i.e., calculating the sum of current command phases in the command queue) of the plurality of commands (also referred to as the second command) of which the command phase value in the current command queue is current command phase.

For example, referring to FIG. 4C, after storing the command F1, the current command phase is "P1", and the second command of which the command phase value in the command queue 403 is the current command phase "P1" is commands N11, N21, and F1, and the sum of commands N11, N21 and F1 is 3. Based on the above, the command phase counting circuit 2152 uses 3 as the command phase count value of the current command phase "P1". That is to say, corresponding to the current command phase, that is, the command phase count value of the first phase P1 is recorded as "3" from the original preset value "0" (as indicated by the arrow A44). Further, in step S209, the command phase counting circuit 2152 adjusts the current command phase from the first command phase of the plurality of command phases into the second command phase. It should be noted that the preset value may also be set to other values other than 0.

For example, referring to FIG. 4C, as shown by the arrow A44, other than changing the command phase count value of the original current command phase P1, the command phase counting circuit 2152 further adjusts the current command phase from "P1" to "P2". In other words, the command phase count table is updated from the command phase count table 410 to the command phase count table 411.

Returning to FIG. 2A, then, in step S210, the command queue management circuit 2151 determines whether the sum of one or more flush commands in the command queue is greater than an upper limit of the phase. Specifically, in response to determining that the sum of one or more flush commands in the command queue is greater than an upper limit of the phase, the command queue management circuit 2151 performs step S205; and in response to determining that the sum of one or more flush commands in the command queue is not greater than an upper limit of the phase, the command queue management circuit 2151 performs step S204.

Specifically, in this embodiment, the value of the upper limit of the phase is the sum (i.e., 3) of the plurality of commands P1 to P3 deducted by one. That is, the upper limit of the phase is used to limit the sum of command phase count values (i.e., the command phase count values used to record values of non-preset values) of the current non-preset value to be the sum of all command phases at maximum. That is, if the command phase count values of all command phases have been used to record the values of non-preset values.

For example, as exemplified in the example of FIG. 4C below, the command queue management circuit 2151 determines that the flush command in the command queue 403 has the command F1 only, that is, the sum (i.e., 1) of all flush commands in the command queue 403 is not greater than the upper limit of the phase (i.e., 3−1=2). Then, the entire process proceeds to step S204.

Figure 4D:
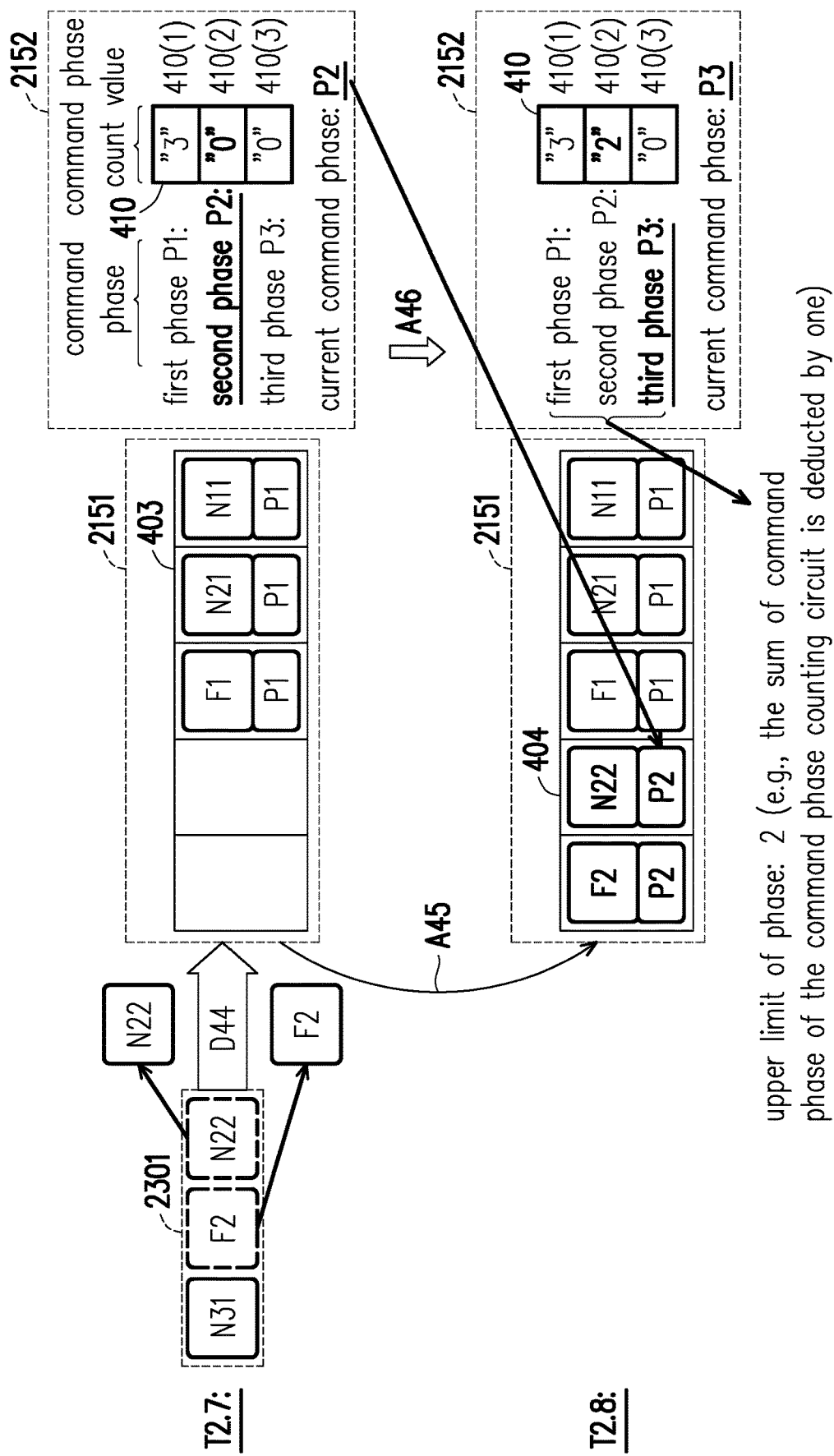

On this occasion, in step S204, the command queue management circuit 2151 determines that the command queue 403 has two remaining spaces, and proceeds to step S201. Referring to FIG. 4D, it is assumed that the command buffer 2301 receives three commands N22, F2, and N31 from the host system 10. Starting from the time point T2.7, as explained in the above flow process, the command N22 and the command F2 are successively acquired (as indicated by the arrow D44), and the commands N22, F2 and the corresponding command phase value "P2" (current command phase value "P2") are stored into the command queue 404 (as indicated by arrow A45).

In addition, since the command F2 is a flush command, the command phase count value 410(2) corresponding to the current command phase "P2" is recorded as "2" (no longer a preset value), and the current command phase is further adjusted from "P2" to "P3" (as indicated by arrow A46, the command phase count table is updated). Then, the process proceeds to step S210. On this occasion, in step S210, the command queue management circuit 2151 determines that the sum of one or more flush commands in the command queue is not greater than the upper limit of the phase. Then, the entire process proceeds to step S204.

However, on this occasion, the command queue management circuit 2151 determines that the command queue 404 does not have a remaining space, and performs step S205. In step S205, the command queue management circuit 2151 does not acquire a new first command from the command buffer 2301. Next, in step 206, the command queue management circuit 2151 selects a new target command from one or more non-flush commands in the command queue, and identifies a target command phase value of the target command as well as the target command phase count value corresponding to the target command phase value. Specifically, in response to that the identified target command phase count value is not equal to the preset value, step S211 is performed; in response to that the identified target command phase count value is equal to the preset value, step S207 is performed. Related descriptions are provided below with reference to FIG. 5A to FIG. 5D.

FIG. 5A to FIG. 5D are schematic diagrams illustrating a management command queue according to another embodiment of the disclosure.

Figure 5A:
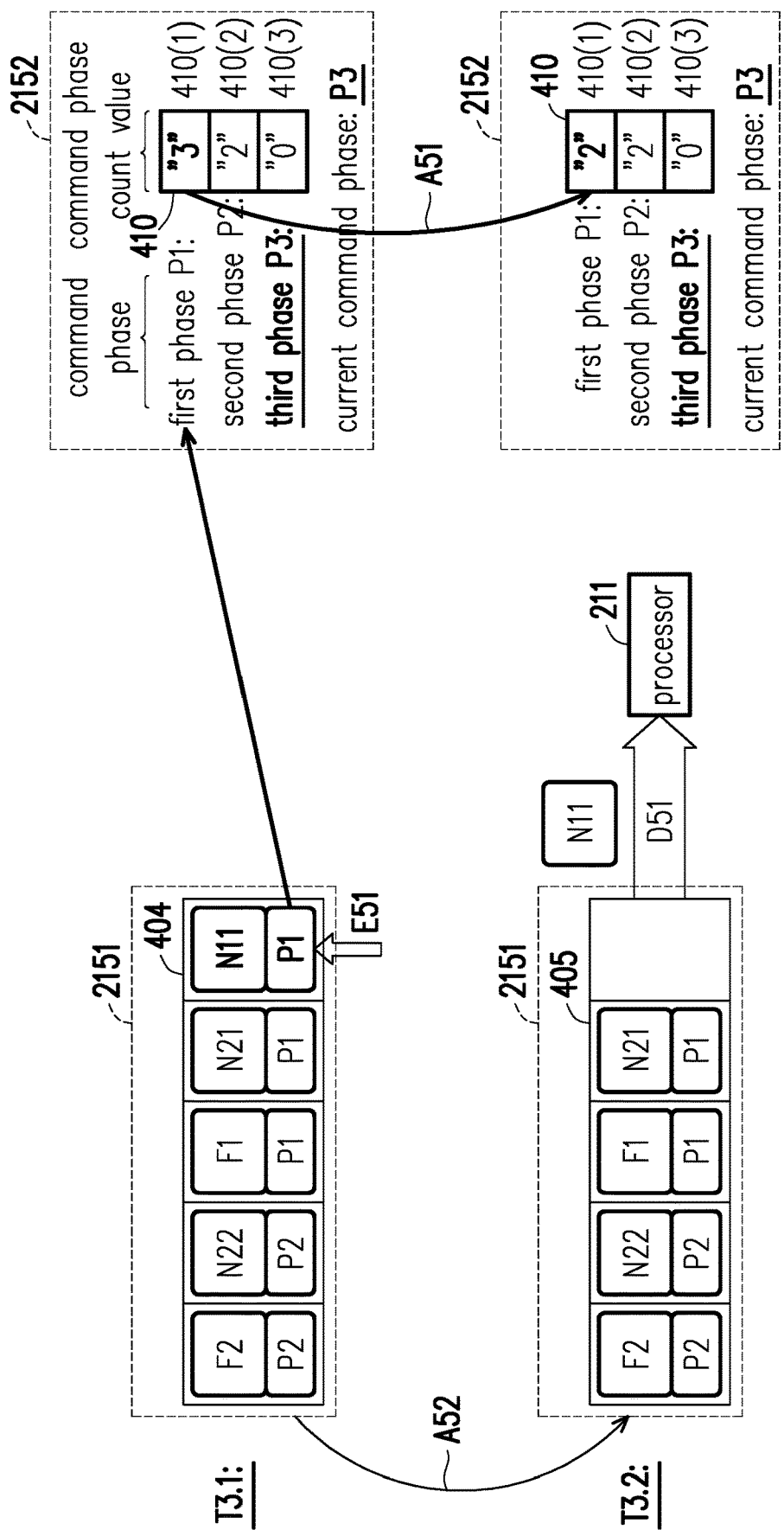

Referring to FIG. 5A, for example, at time point T3.1, the command queue management circuit 2151 identifies one or more non-flush commands in the command queue 404, i.e., commands N11, N21, N22. The command queue management circuit 2151 selects one of the commands N11, N21, and N22 as the target command according to a preset rule. For ease of explanation, the preset rule is first in, first out. That is, the non-flush command that is first stored into the command queue among the commands N11, N21, and N22 is selected first as the new target command. In the example of FIG. 5A, as indicated by an arrow E51, the command N11 is selected as the target command, and the command queue management circuit 2151 identifies that the command phase value (also referred to as the target command phase value) of the command N11 as "P1". According to the target command phase value "P1", the command queue management circuit 2151 identifies "3" according to the command phase count value 410(1) corresponding to the command phase "P1" recorded by the command phase counting circuit 2152 (e.g., the target command phase count value that is looked up according to the target command phase and the command phase count table is "3").

Referring to FIG. 5A, on this occasion, at time point T3.2, in response to that the identified target command phase count value is not equal to the preset value, the command phase counting circuit 2152 deducts the target command phase count value by 1, i.e., the command phase count value 410(1) corresponding to the command phase P1 is adjusted from "3" into "2" (as indicated by the arrow A51).

After deducting by 1, the command queue management circuit 2151 determines whether the target command phase count value is equal to 1. In response to that the target command phase count value is equal to 1, the process proceeds to step S212; in response to that the target command phase count value is not equal to 1, the process proceeds to step S207.

For example, in the above example, since the target command phase count value is "2", which is not equal to 1, the flow process proceeds to step S207. The command queue management circuit 2151 instructs the processor 211 to execute the target command, and in response to completion of execution of the target command, the command queue management circuit 2151 deletes the target command from the command queue. As indicated by an arrow D51 of FIG. 5A, the command N11 is transmitted to the processor 211 to make the processor 211 to perform a corresponding operation according to the command N11. It should be noted that the disclosure is not limited to the details of executing the commands by the processor 211. Next, as indicated by an arrow A52, the command queue management circuit 2151 deletes the target command N11 and the corresponding target command phase value "P1" from the command queue 404. On this occasion, the command queue 405 has one remaining space (because the target command N11 and the corresponding target command phase value "P1" are deleted).

Figure 5B:
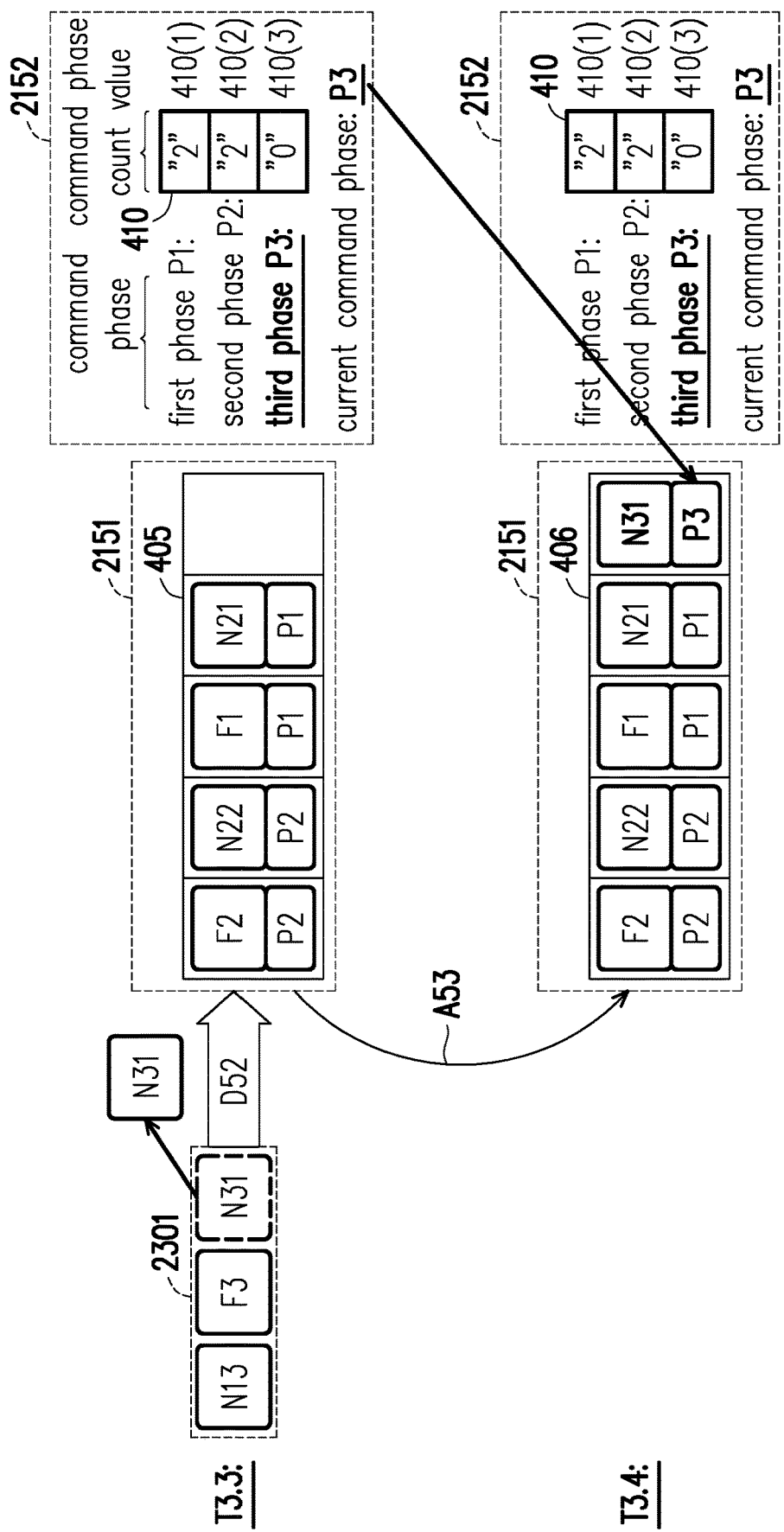

Then, the overall process returns to step S201. Referring to FIG. 5B, for example, it is assumed that the command buffer 2301 has three host commands N31, F3, and N13. At time point T3.3, as indicated by arrow D52, the command N31 is acquired. At time point T3.4, as indicated by arrow A53, the command N31 and the corresponding command phase value "P3" are stored into the command queue 406. On this occasion, since the command queue 406 has no more remaining space, the flow process executes step S205 again.

Figure 5C:
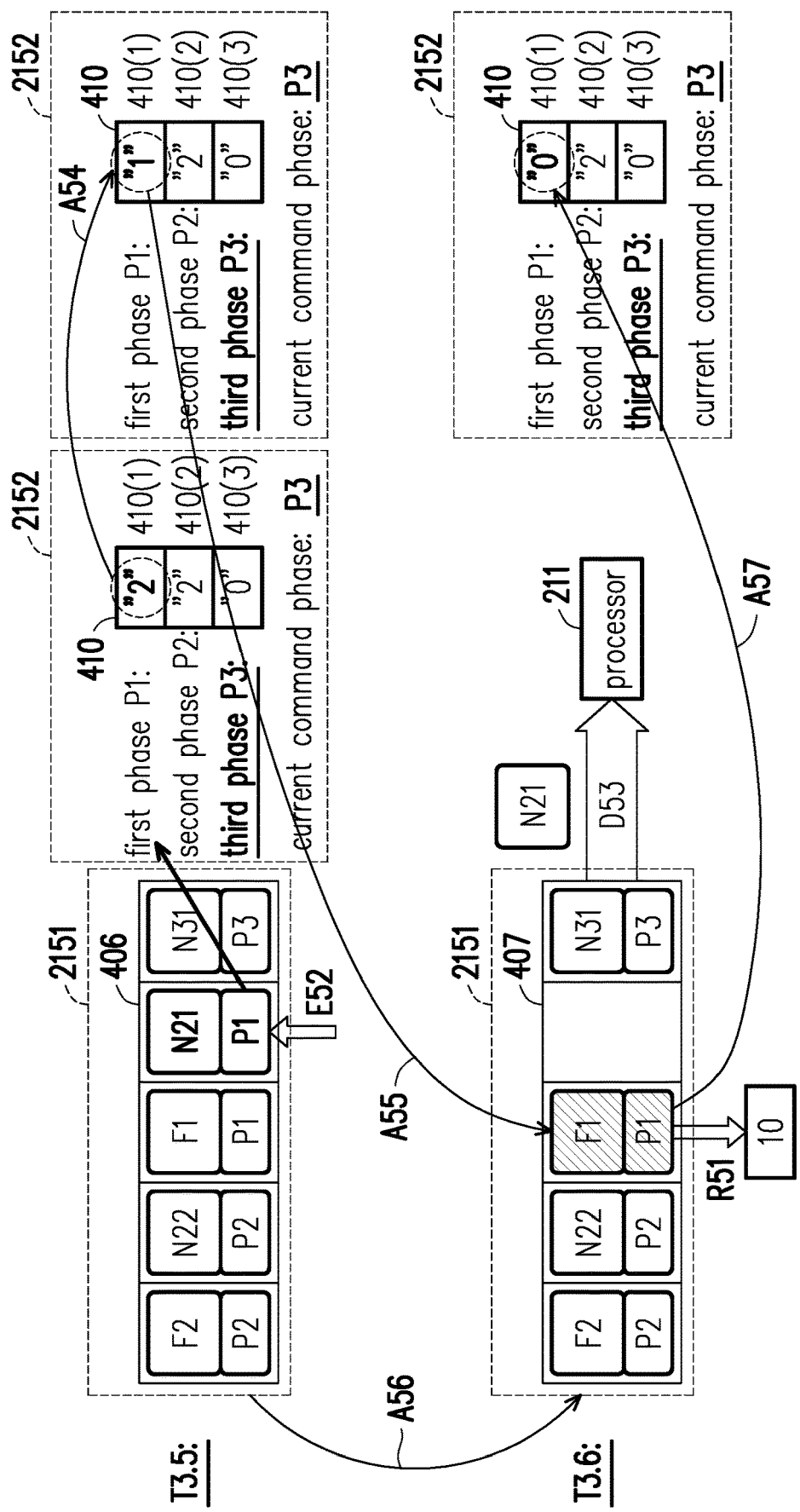

For example, referring to FIG. 5C, at time point T3.5, as indicated by arrow E52, the command queue management circuit 2151 selects the command N21 as the target command and deducts the corresponding command phase count value from "2" to "1" (as indicated by arrow A54). On this occasion, as indicated by an arrow A55, in response to that the target command phase count value is equal to 1, the process proceeds to step S212. In step S212, the command queue management circuit 2151 instructs the processor 211 to execute the target command, and in response to completing the execution of the target command, the target command in the command queue is deleted. Step S212 is similar to step S207, and related details are omitted herein (for example, as indicated by arrow D53). For example, as indicated by the arrow A56, at time point T3.6, the command N21 and the corresponding command phase value "P1" are deleted. However, unlike the step S201 following the step S207, after the command queue management circuit 2151 performs step S212, the process proceeds to step S213. That is, the command queue management circuit 2151 deletes the target flush command from the command queue, and responds to the host system that the target flush command corresponding to the target command phase value has been executed. Since the command N21 that is instructed to be deleted by the flush command F1 has been deleted, as indicated by the arrow R51, the command queue management circuit 2151 instructs the processor 211 (or the command queue management circuit 2151 itself) to respond to the host system 10 that the flush command has been executed. It should be noted that the above example shows, in the embodiment, for the duration after the flush command F1 is received and prior to responding that the flush command F1 has been executed, the flush command F1 itself is not executed and other non-flush commands (e.g., command N21) not corresponding to the flush command F1 are executed in the meantime. In addition, when the non-flush commands corresponding to the flush command F1 are executed, the command queue management circuit 2151 responds directly to the host system that the flush command F1 has been executed. In other words, the host command management operation in the embodiment does not cause the execution order of other non-flush commands not corresponding to flush commands and prior to the flush command to be robbed because the flush command is received, thereby avoiding the occurrence of resource robbing caused by the flush command.

Next, proceeding to step S214, the command phase counting circuit 2152 sets the target command phase count value as the preset value. For example, as indicated by the arrow A57, after responding that the flush command corresponding to the target command phase value has been executed, the target command phase count value 410(1) is set as a preset value (e.g., "0").

Then, the overall process flow returns to step S201. Referring to FIG. 5D, at time point T3.7, as indicated by arrow D54, the command F3 is acquired. At time point T3.8, as indicated by arrow A58, the command F3 and the corresponding command phase value "P3" ate stored into the command queue 408, and the command phase count value 410(3) corresponding to the current command phase "P3" is recorded as "2" (because the command queue 408 has two command phase values that are "P3"). The current command phase is further adjusted from "P3" into "P1" (as indicated by arrow A59). Next, similar to the description provided in the above embodiment, the process flow proceeds to step S201 again.

It should be pointed out that, in response to that the command buffer 2301 and the command queue do not have any command, the host command management circuit unit 215 ends all the steps of the above memory management method. Further, in response to receiving one command from the host system 10 through an empty command buffer 2301, the processor 211 may instruct the host command management circuit unit 215 to start performing the above step S201. Specifically, during the execution of step S201, if the command buffer 2301 does not have the new first command that can be acquired (for example, the command buffer 2301 is empty), step S206 is performed.

In summary, the memory management method and the storage controller provided in the embodiment are capable of recording the corresponding command phase count value and update the current command phase when the command queue receives the flush command, and do not directly execute and clear the non-flush command corresponding to the flush command in the command queue according to the received flush command. In addition, the recorded command phase count value is further adjusted according to different conditions to manage commands corresponding to different command phases in the command queue, thereby completing the received flush command. That is to say, the memory management method and the storage controller provided in the embodiment may make the non-flush command corresponding to the flush command in the command queue have no special priority (avoiding resource robbing of the non-flush command), so as to avoid delaying execution of other commands. In this manner, the storage device may complete the received flush command while smoothly digesting (executing) all the commands in the command queue, thereby improving the data access efficiency and work efficiency of the storage device.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A memory management method, adapted for a storage device equipped with a rewritable non-volatile memory module and a storage controller, the method comprising the following steps:
   (1) acquiring a new first command from a command buffer, and determining whether the first command is a flush command, wherein in response to determining that the first command is the flush command, performing step (2a), wherein in response to determining that the first command is not the flush command, performing step (2b);
   (2a) setting a command phase value of the flush command according to a current command phase, storing the flush command into a command queue, identifying a plurality of second commands corresponding to the current command phase in the command queue, and counting a sum of the second commands to become a command phase count value corresponding to the current command phase;
   adjusting the current command phase from a first command phase of a plurality of command phases into a second command phase; and
   performing step (1) or step (3) according to a remaining space in the command queue and a sum of one or more flush commands stored in the command queue;
   (2b) setting a command phase value of the first command according to the current command phase, storing the first command into the command queue, and performing step (1) or step (3) according to the remaining space in the command queue;
   (3) stop acquiring a new first command from the command buffer, and performing step (4);
   (4) selecting a new target command from one or more non-flush commands stored in the command queue, identifying a target command phase value of the target command and a target command phase count value corresponding to the target command phase value, wherein in response to that the identified target command phase count value is equal to a preset value, performing step (5a), wherein in response to that the identified target command phase count value is not equal to the preset value, performing step (5b);
   (5a) executing the target command, and in response to completing the execution of the target command, deleting the target command from the command queue, and performing step (1);
   (5b) changing the target command phase count value, and performing step (5a) or step (5c) according to the changed target command phase count value;
   (5c) executing the target command, responding to a host system that a target flush command corresponding to the target command phase value has been executed, setting the target command phase count value as the preset value, and performing step (1).

2. The memory management method according to claim 1, wherein the command buffer is configured to receive a command from the host system, wherein the method further comprises the following steps:
   in response to that the command buffer and the command queue do not have any command, ending all steps of the above memory management method; and
   in response to receiving the command from the host system through the empty command buffer, starting to perform the above step (1),
   wherein the step of acquiring the new first command from the command buffer in the step (1) comprises, in response to that the command buffer does not have the acquirable new first command, performing step (4).

3. The memory management method according to claim 1, wherein the command queue is maintained in a host command management circuit unit, and all commands in the command queue are respectively marked with corresponding command phase values, wherein one command phase count table is maintained in the host command management circuit unit, and the command phase count table records a plurality of command phases and a plurality of command phase count values respectively corresponding to the command phases, wherein the step (4) comprises:
   selecting the target command from the one or more non-flush commands in the command queue according to a first in first out manner; and
   identifying the marked target command phase value of the target command from the command queue, and looking up the corresponding target command phase count value from the command phase count table according to the target command phase value.

4. The memory management method according to claim 1, wherein the step (5b) comprises:
   in response to that the identified target command phase count value is not equal to the preset value, deducting the target command phase count value by one to change the target command phase count value;
   determining whether the changed target command phase count value is equal to 1, wherein in response to that the target command phase count value is not equal to 1, performing step (5a),
   wherein in response to that the target command phase count value is equal to 1, performing step (5c),
   wherein the step (5c) comprises:
   in response to completing execution of the target command, deleting the target command and the target flush command in the command queue.

5. The memory management method according to claim 1, wherein the flush command instructs to delete one or more first non-flush commands of the non-flush commands in the command queue, wherein the step (2a) comprises:
   not executing the one or more non-flush commands according to the flush command, and not deleting the one or more non-flush commands;
   recording the command phase count value to correspond to the first command phase in the command phase,
   wherein the command phases are arranged in a round robin manner, and the second command phase is arranged after the first command phase.

6. The memory management method according to claim 5, wherein the step (2a) further comprises:
   determining whether the sum of the one or more flush commands in the command queue is greater than an upper limit of phase,
   wherein in response to determining that the sum of the one or more flush commands is greater than the upper limit of phase, performing step (3),
   wherein in response to determining that the sum of the one or more flush commands is not greater than the upper limit of phase, determining whether the command queue has the remaining space, wherein in response to determining that the command queue does not have the remaining space, performing step (3), wherein in response to determining that the command queue has the remaining space, performing step (1).

7. A storage controller for controlling a storage device equipped with a rewritable non-volatile memory module, the storage controller comprising:
   a connection interface circuit, coupled to a host system, wherein the connection interface circuit comprises a command buffer for temporarily storing a command from the host system;
   a memory interface control circuit, coupled to the rewritable non-volatile memory module;
   a host command management circuit unit; and
   a processor, coupled to the connection interface circuit, the memory interface control circuit and the host command management circuit unit, wherein the processor instructs the host command management circuit unit to perform a host command management operation, the host command management operation comprises the following steps:
   (1) acquiring a new first command from a command buffer through the host command management circuit unit, and determining whether the first command is a flush command, wherein in response to determining that the first command is the flush command, performing step (2a), wherein in response to determining that the first command is not the flush command, performing step (2b);
   (2a) setting a command phase value of the flush command according to a current command phase through the host command management circuit unit, storing the flush command into a command queue, identifying a plurality of second commands corresponding to the current command phase in the command queue, and counting a sum of the second commands to become a command phase count value corresponding to the current command phase;
   adjusting the current command phase from a first command phase of a plurality of command phases into a second command phase through the host command management circuit unit; and
   performing step (1) or step (3) through the host command management circuit unit according to a remaining space in the command queue and a sum of one or more flush commands in the command queue;
   (2b) setting a command phase value of the first command according to the current command phase through the host command management circuit unit, storing the first command into the command queue, and performing step (1) or step (3) according to the remaining space in the command queue;
   (3) stop acquiring a new first command from the command buffer through the host command management circuit unit, and performing step (4);
   (4) selecting a new target command from one or more non-flush commands stored in the command queue through the host command management circuit unit, identifying a target command phase value of the target command and a target command phase count value corresponding to the target command phase value, wherein in response to that the identified target command phase count value is equal to a preset value, performing step (5a), wherein in response to that the identified target command phase count value is not equal to the preset value, performing step (5b);
   (5a) instructing the processor to execute the target command through the host command management circuit unit, and in response to completing the execution of the target command, deleting the target command from the command queue, and performing step (1);
   (5b) changing the target command phase count value through the host command management circuit unit, and performing step (5a) or step (5c) according to the changed target command phase count value;
   (5c) instructing the processor to execute the target command through the host command management circuit unit, responding to a host system that a target flush command corresponding to the target command phase value has been executed, setting the target command phase count value as the preset value, and performing step (1).

8. The storage controller according to claim 7, wherein the command buffer is configured to receive a command from the host system, wherein the host command management operation further comprises the following steps:
   in response to that the command buffer and the command queue do not have any command, completing the host command management operation through the host command management circuit unit; and
   in response to receiving the command from the host system through the empty command buffer, the processor instructing the host command management circuit unit to start performing the step (1) in the host command management operation,
   wherein in the operation of acquiring the new first command from the command buffer in the step (1), in response to that the command buffer does not have the acquirable new first command, performing step (4) through the host command management circuit unit.

9. The storage controller according to claim 7, wherein the command queue is maintained in the host command management circuit unit, and all commands in the command queue are respectively marked with corresponding command phase values, wherein one command phase count table is maintained in the host command management circuit unit, and the command phase count table records a plurality of command phases and a plurality of command phase count values respectively corresponding to the command phases, wherein the step (4) comprises:
   selecting the target command from the one or more non-flush commands in the command queue according to a first in first out manner through the host command management circuit unit; and
   identifying the marked target command phase value of the target command from the command queue through the host command management circuit unit, and looking up the corresponding target command phase count value from the command phase count table according to the target command phase value.

10. The storage controller according to claim 7, wherein the step (5b) comprises:
    in response to that the identified target command phase count value is not equal to the preset value, deducting the target command phase count value by one through the host command management circuit unit to change the target command phase count value;
    determining whether the changed target command phase count value is equal to 1 through the host command management circuit unit, wherein in response to that the target command phase count value is not equal to 1, performing step (5a) through the host command management circuit unit, wherein in response to that the target command phase count value is equal to 1, performing step (5c),
    wherein the step (5c) comprises:

in response to completing execution of the target command, deleting the target command and the target flush command in the command queue through the host command management circuit unit.

11. The storage controller according to claim 7, wherein the flush command instructs to delete one or more first non-flush commands of the non-flush commands in the command queue, wherein the step (2a) comprises:
not executing the one or more non-flush commands according to the flush command through the host command management circuit unit, and not deleting the one or more non-flush commands through the host command management circuit unit;
recording the command phase count value through the host command management circuit unit to correspond to the first command phase in the command phase,
wherein the command phases are arranged in a round robin manner, and the second command phase is arranged after the first command phase.

12. The storage controller according to claim 11, wherein the step (2a) further comprises:
determining whether the sum of the one or more flush commands in the command queue is greater than an upper limit of phase through the host command management circuit unit,
wherein in response to determining that the sum of the one or more flush commands is greater than the upper limit of phase, performing step (3),
wherein in response to determining that the sum of the one or more flush commands is not greater than the upper limit of phase, determining whether the command queue has the remaining space through the host command management circuit unit, wherein in response to determining that the command queue does not have the remaining space, performing step (3), wherein in response to determining that the command queue has the remaining space, performing step (1).

* * * * *